(12) United States Patent
Liou

(10) Patent No.: US 7,881,729 B2
(45) Date of Patent: Feb. 1, 2011

(54) GPS-MICROPHONE FOR COMMUNICATION SYSTEM

(76) Inventor: Henry Liou, 480 Apollo St., Suite E, Brea, CA (US) 92821

( * ) Notice: Subject to any disclaimer, the term of this patent is extended or adjusted under 35 U.S.C. 154(b) by 1039 days.

(21) Appl. No.: 11/187,181

(22) Filed: Jul. 21, 2005

(65) Prior Publication Data

US 2005/0255860 A1    Nov. 17, 2005

Related U.S. Application Data

(60) Division of application No. 10/922,742, filed on Aug. 19, 2004, now Pat. No. 7,783,298, which is a division of application No. 10/434,701, filed on May 12, 2003, now Pat. No. 6,912,397, which is a continuation-in-part of application No. 10/377,566, filed on Feb. 26, 2003, now Pat. No. 6,941,147.

(51) Int. Cl.
  *H04W 24/00*    (2009.01)

(52) U.S. Cl. .................. 455/456.1; 455/456.6; 455/9; 701/201; 342/357.01

(58) Field of Classification Search ............ 455/456.6, 455/456.9; 701/201; 342/357.01
See application file for complete search history.

(56) References Cited

U.S. PATENT DOCUMENTS 5,422,816 A    6/1995    Sprague 5,884,199 A *    3/1999    Maki .................. 455/575.1
6,721,633 B2 *    4/2004    Funk et al. .................. 701/1
2002/0186164 A1 *    12/2002    Hsu et al. .............. 342/357.09

FOREIGN PATENT DOCUMENTS

JP    3130461    5/1997

OTHER PUBLICATIONS

Bob Bruninga, APRS Mic-Lite ARRL and TAPR Digital Communications Conference 18th, 13 pages, Phoenix, Sep. 24-26, 1999.
U.S. Appl. No. 09/876,025, filed Dec. 12, 2002, William Hsu.

* cited by examiner

*Primary Examiner*—Nay A. Maung
*Assistant Examiner*—Richard Chan
(74) *Attorney, Agent, or Firm*—Raymond Y. Chan; David and Raymond Patent Firm

(57) ABSTRACT

A communication apparatus, such as a GPS-microphone, which is adapted for incorporating a communication system, includes a communication unit such as a speaker-microphone set, a communication transmitter such as a radio frequency transmitter communicatively networked with the communication system through radio frequency signals, and a positioning controller such as GPS controller electrically connected with the communication transmitter to encode positioning data into one or more RF positioning signals in form of audio signals wherein when the positioning controller is triggered, the communication transmitter is activated to transmit RF positioning signals to the communication system.

11 Claims, 7 Drawing Sheets

US 7,881,729 B2

GPS-MICROPHONE FOR COMMUNICATION SYSTEM

CROSS REFERENCE OF RELATED APPLICATION

This is a divisional application that claims the benefit of priority under 35 U.S.C. §119 to a non-provisional application, application Ser. No. 10/922,742, filed Aug. 19, 2004, now U.S. Pat. No. 7,783,298 which is a divisional application of a non-provisional application, application Ser. No. 10/434,701, filed May 12, 2003, now U.S. Pat. No. 6,912,397 which is a Continuation-In-Part application of a non-provisional application, application Ser. No. 10/377,566, filed Feb. 26, 2003 now U.S. Pat. No. 6,941,147.

BACKGROUND OF THE PRESENT INVENTION

1. Field of Invention

The present invention relates to a communication system, and more particularly to a GPS-microphone for a communication system, wherein the GPS-microphone is capable of sending out positioning data in form of audio signals to a control center such that the GPS-microphone supports both the communication provision and the position location provision.

2. Description of Related Arts

Communication devices, such as cellular phone, satellites phone, PDA, and "Pocket PC", are considered as one of the common communication tools that a user is able to wirelessly communicate with another user through the communication device via a public network. A kind of conventional communication device generally comprises a microphone speaker and a wireless (codec) modem such as RF transmitter/receiver connected with the microphone speaker in such a manner that when the microphone speaker receives an audio signal, the audio signal is encoded to a digital data and sent out in a wireless manner.

Generally speaking, a two-way radio system is considered as one of the most common low-end communication devices, wherein the two-way radio communication system comprises a remote user sending and receiving voice communications to a user at a base station location along a pre-established communications channel. Those communications are half-duplex in nature whereby a user asserts a Push-To-Talk (PTT) switch associated with the radio to transmit a message, otherwise the radio is in receive mode listening for messages when the switch is not asserted. In many scenarios, a detachable corded hand-held microphone unit is used with the radio which the user primarily uses to send and receive voice communications via the radio. The microphone unit has its own PTT switch which controls the radio transmit/receive mode.

The interface between the radio and the handheld microphone unit in this scenario typically comprises a PTT signal from microphone unit to radio, a mic-audio from microphone unit to radio, a speaker audio from radio unit to microphone unit, a ground return from microphone unit to radio, and a optional DC Offset voltage from radio unit to microphone unit.

With PTT asserted, the mic-audio signal from the microphone unit is passed as a baseband signal to the radio which performs conditioning, modulation, and RF signal transmission to complete the transmit steps. With PTT de-asserted, the radio serves to receive the RF signal transmission, demodulate and condition, and then to send the baseband signal as speaker audio to the microphone unit.

Nowadays, the conventional communication devices can be incorporated with a Global Positioning System (GPS) for tracking the location of the user, wherein the common GPS generally comprises a built-in GPS receiver equipped with the modem to wirelessly send out a positioning data from the communication device. In order to receive the GPS positioning data, the communication device must employ a processor unit arranged in such a manner that after the processor unit receives the positioning data, the positioning data is decoded to a readable data so that the user is able to locate the position of the sender.

However, such GPS incorporated communication device has several drawbacks. The communication device must be employed with the modem for wirelessly transmitting both the audio signal and the positioning data, which will highly increase its manufacturing cost. Furthermore, the data transmission speed of the modem is inconsistent such that there is always a delay when both the audio signal and the positioning data are sent out.

In addition, existing lower-end radio systems do not support position location provisions, although providing a remote user's position to a base station would be very desirable to enable tracking of the remote user, particularly through the use of the Global Positioning Satellite (GPS) system. Therefore, the GPS must be independently installed to provide positioning data.

For example, while patrolling, police officers or security officers generally must arm with a radio frequency communication device to keep contact with the control center. For safety and arrangement purpose, their locations are preferred to be tracked by the control center so that the control center can give assistance to them in case of emergency. However, the police officers or the security officers must carry an additional GPS device in order to send out the positioning signals to the control center. In other words, the additional GPS device will increase the load of the police officers or the security officers while patrolling.

SUMMARY OF THE PRESENT INVENTION

A main object of the present invention is to provide a GPS-microphone for a communication system, wherein the GPS-microphone is capable of sending out positioning data in form of audio signals to a control center such that the GPS-microphone supports both the communication provision and the position location provision.

Another object of the present invention is to provide a GPS-microphone for a communication system, wherein the positioning data is transmitted through a radio frequency so as to provide an instant positioning location to the communication system in a wireless communication manner.

Another object of the present invention is to provide a GPS-microphone for a communication system, wherein a conventional microphone can be upgraded to form the GPS-microphone without modifying the original radio frequency transmitting system of the conventional microphone and the communication system, so as to minimize the manufacturing cost of the communication system incorporating with the GPS-microphone. In other words, the present invention enables existing lower-end two-way radio systems to be upgradeable to support acquiring and providing user position data without modification neither to the radio system itself nor to the radio communication infrastructure. A modification is instead made to the low-cost detachable microphone units.

Another object of the present invention is to provide a GPS-microphone for a communication system, which successfully provides an economic and efficient solution for transmitting the positioning data from the GPS-microphone to the communication system through the radio frequency.

Another object of the present invention is to basically sever the radio-to-microphone interface signals and comprises four basic components: GPS antenna and receiver unit; a controller unit; a data packet modem; and a baseband processing unit. Basically, packet modem data is mixed with the baseband signal to enable control messages and data messages to be transmitted using the existing radio voice channel open between the remote user and base station. It is also an object of the present invention to provide a methodology for controlling the acquisition, transmission, and processing of user GPS information within such a system set-up.

The novelty of the present invention is in how they are integrated together and with the rest of the radio equipment, and how they implement a methodology to provide such position reporting within such a system. The GPS antenna and receiver unit provide GPS location information from the external GPS satellites to the controller unit which serves as the "brains" for the present invention. The controller also monitors user PTT signals and sends processed PTT signals to the radio. The controller also has a host computer interface which is only used when the present invention is used in a base-station configuration. In such instances, the host computer initiates polling requests or configuration change messages to a remote unit. The controller also interfaces with a half-duplex data packet modem to which it sends along a digital GPS data message (if remote user) or a control message (if base station user) that is desired to be transmitted. Conversely, the controller can read digital data from the modem which corresponds either to a received GPS data message (if base station user) or a received control message (if remote user). The packet modem also interfaces with the baseband processor. The baseband processor basically processes the mic- and the speaker audio signals to and from the radio, and mixes and extracts the packet modem signals.

The premise of the methodology of the invention is that the remote unit would autonomously acquire and maintain position information via GPS, and conditionally include this information within a voice transmission based on a last reported time criteria. The base station would only send a control message to the remote unit if it wants to poll the unit, implying the remote would send a position message alone without voice communications if need be, as soon as possible over the current voice channel. The other case is if the base station wishes to change the current behavior of that remote unit such as increasing position reporting frequency.

Accordingly, in order to accomplish the above objects, the present invention provides a GPS-microphone for a communication system, comprising a speaker-microphone set, a radio frequency transmitter communicatively networked with the communication system through radio frequency signals, and a GPS controller electrically connected with the radio frequency transmitter to encode a positioning data into a RF positioning signals in form of audio signals wherein when the GPS controller is triggered, the radio frequency transmitter is activated to transmit RF positioning signals to the communication system.

In addition, the present invention further provides a process of transmitting a positioning data to a communication system from a GPS-microphone which comprises a speaker-microphone set, a radio frequency transmitter and a GPS controller, wherein the process comprises the steps of:

(a) communicatively networking the radio frequency transmitter to the communication system through radio frequency signals;

(b) activating the GPS controller to convert the positioning data into RF positioning signals in form of audio signals; and (c) activating the radio frequency transmitter to transmit the RF positioning signals to the communication system.

These and other objectives, features, and advantages of the present invention will become apparent from the following detailed description, the accompanying drawings, and the appended claims.

DETAILED DESCRIPTION OF THE PREFERRED EMBODIMENT

Figure 2:
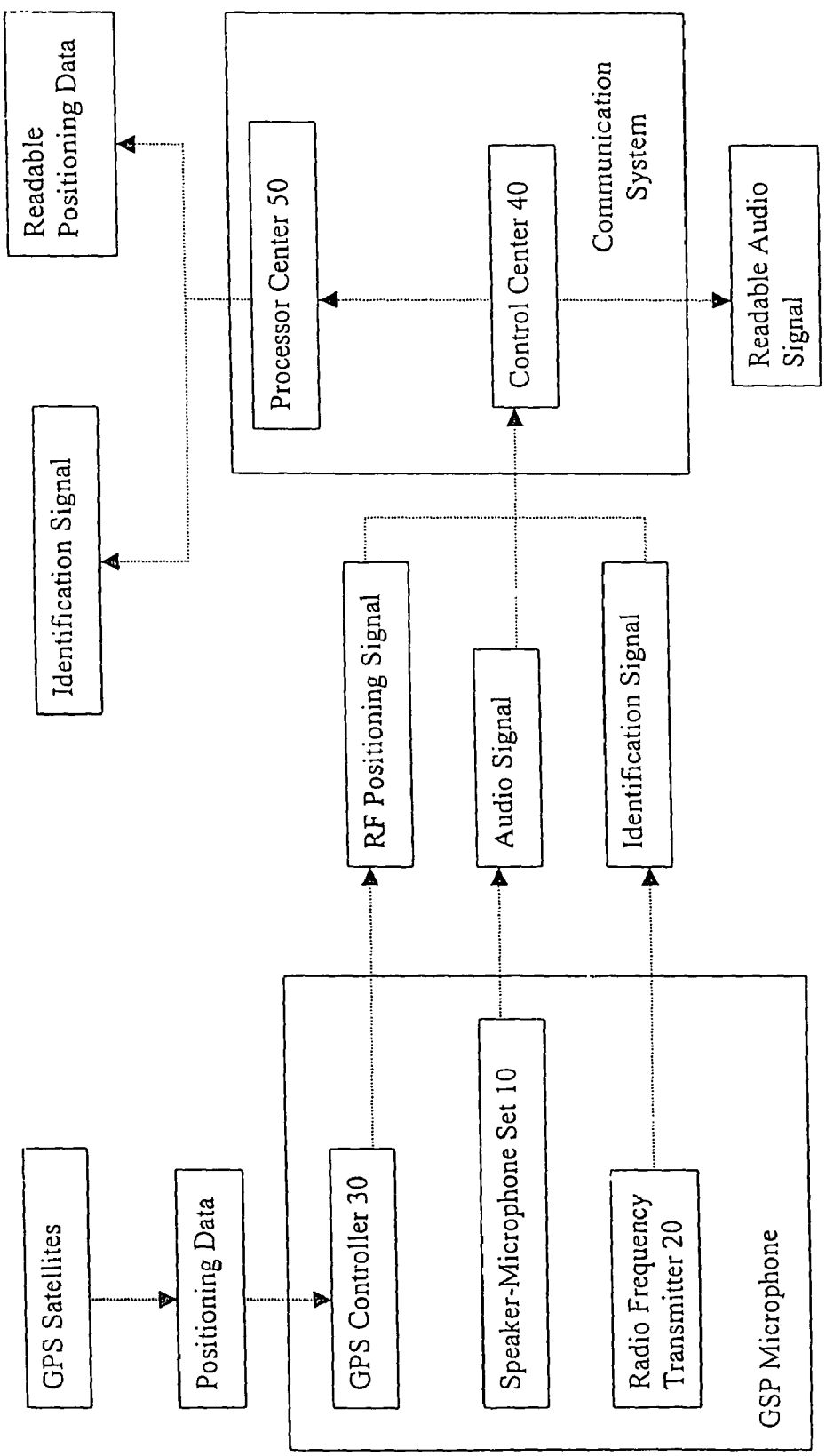
FIG. 2 is a flow chart for transmitting a positioning data from the GPS-microphone for the communication system according to the above preferred embodiment of the present invention.
Figure 3:
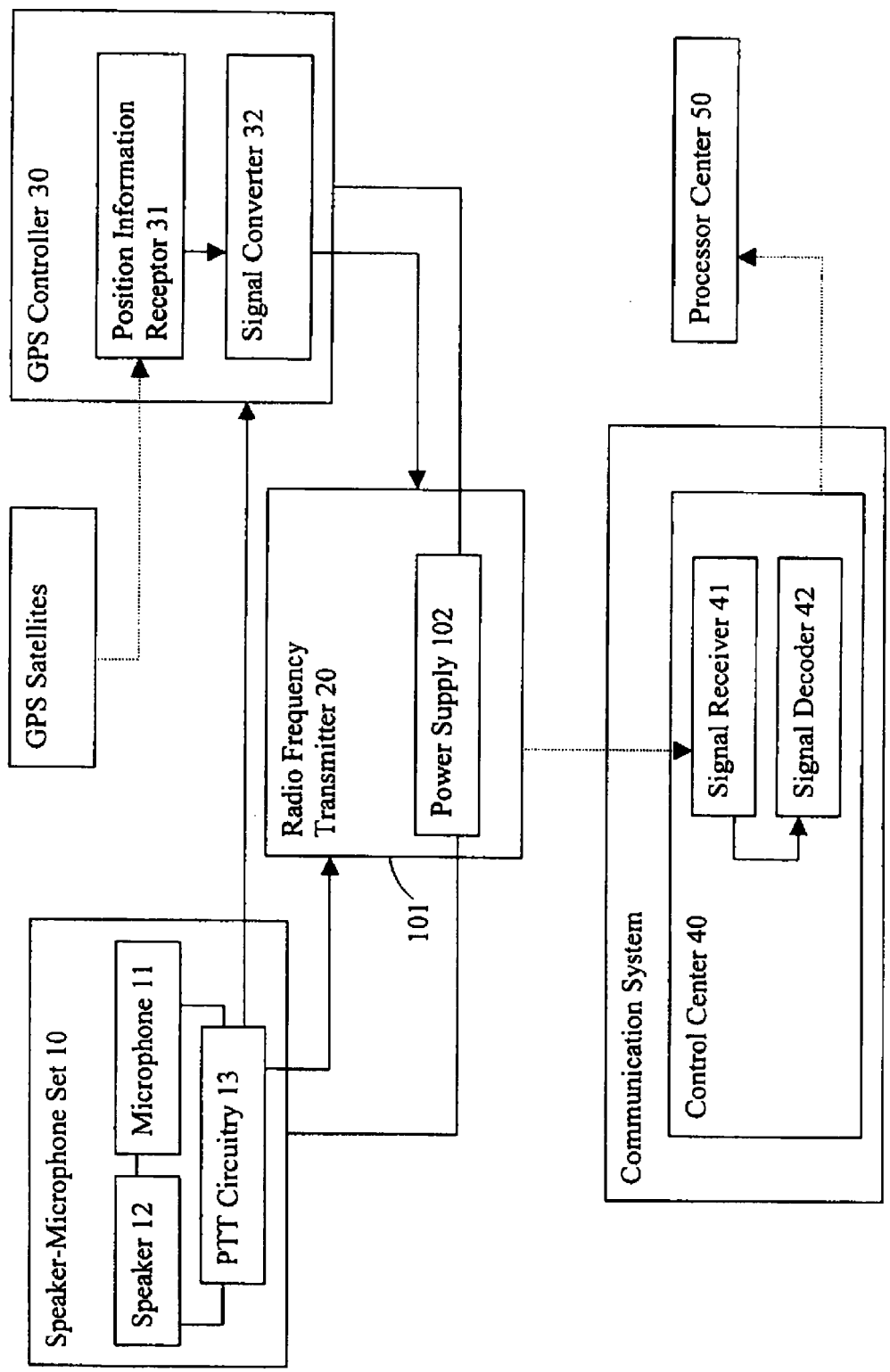
FIG. 3 illustrates an alternative mode of the communication system according to the above preferred embodiment of the present invention.
Figure 4:
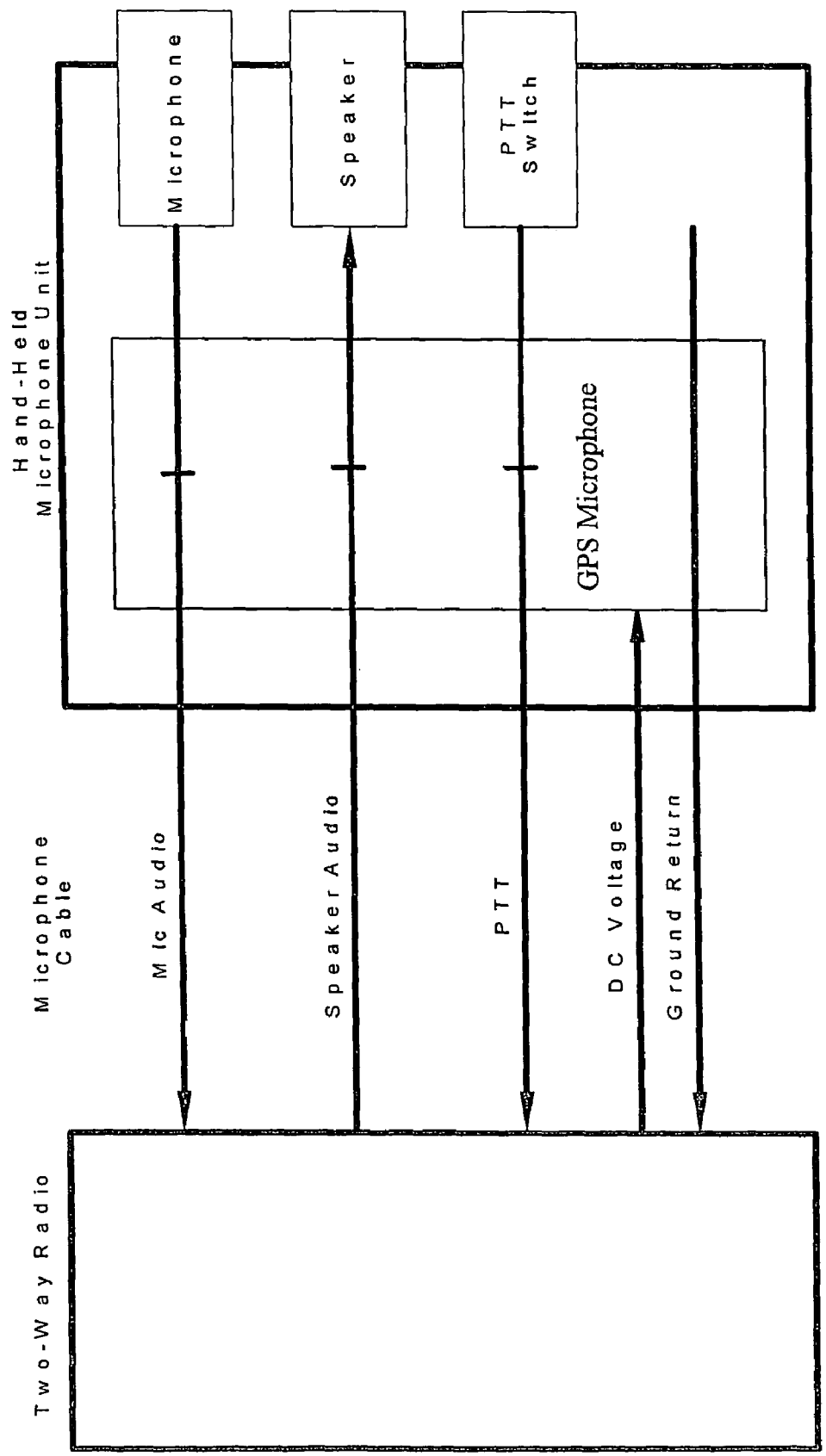
FIG. 4 is a signal diagram of the existing radio-to-handheld microphone interface, illustrating the GPS-microphone being incorporated therewith.

Referring to FIGS. 1 through 7 of the drawings, a communication apparatus embodied as a GPS-microphone for a communication system according to a preferred embodiment of the present invention is illustrated, wherein the GPS-microphone of the present invention is capable of incorporating with the radio and the hand-held microphone unit and the interface signals that are impacted, as shown in FIG. 4.

The GPS-microphone comprises a speaker-microphone set 10, a radio frequency transmitter 20 communicatively networked with the communication system through radio frequency signals, and a GPS controller 30 electrically connected with the radio frequency transmitter 20 to convert positioning data into one or more RF positioning signals in form of audio signals wherein when the GPS controller 30 is triggered, the radio frequency transmitter 20 is activated to transmit the RF positioning signals to the communication system.

The speaker-microphone set 10, which is constructed as the hand-held microphone unit, comprises a microphone 11, a speaker 12, and a PTT (push-to-talk) circuitry 13 arranged in such a manner that when the PTT circuitry 13 is triggered to activate the microphone 11 in a transmit mode, the microphone 11 is capable of receiving and encoding a voice message into an audio signal.

According to the preferred embodiment, the speaker-microphone set 10 can be a conventional push-to-talk wireless communication system, such as a two-way radio system, wherein when the PTT circuitry 13 is triggered, the microphone 11 of the speaker-microphone set 10 is ready to receive the audio signals in such a manner that the radio frequency transmitter 20 of the radio of the two-way radio system is adapted to transmit the audio signals to the communication system.

The radio frequency transmitter 20 of the GPS-microphone is a radio frequency transmitting device adapted to send and receive the radio frequency, wherein the radio frequency transmitter 20 functions as a wireless communication link between the GPS-microphone and the communication system. Accordingly, when the communication system is a two-way radio system, the radio frequency transmitter 20 transmits the audio signals from the GPS-microphone to the communication system.

The radio frequency transmitter 20 can be automatically or manually tuned to communicate with another communication system by matching the same radio frequency. In other words, more than one GPS-microphones can be set to use the same radio frequency by the manufacturer or security service company. Alternatively, the user is also able to manually tune the radio frequency transmitter 20 to communicatively network with another desirable communication system or automatically tune the radio frequency transmitter 20 to search another communication system that is positioned within the coverage area with respect to the communication system.

The GPS controller 30 is arranged for managing how and when position data is processed and passed along to another component. It monitors stimulus conditions such as the Push-To-Talk (PTT) activation and does all the time keeping and decision making. Because of limited required processing throughput, the cited example with the present invention is a basic 8-bit micro-controller. Alternatives to this range from custom sequential/combinational logic implementations of a basic controller, to specialized devices such as PICs (Peripheral Interface Controller), to high-end RISC and CISC architecture-based microprocessors.

The GPS controller 30 comprises means 31 for receiving the positioning data from an external position transponder system, such as an external GPS satellites, and a signal converter 32 arranged to convert the positioning data into the RF positioning signals, wherein the RF positioning signals is transmitted to the communication system through the radio frequency transmitter 20.

The receiving means 31 according to the preferred embodiment is a position information receptor, such as a GPS antenna, adapted for wirelessly communicating with the GPS satellites so as to receive a GPS position data as the positioning data therefrom. The receiving means 31 performs physical interface layer processing, correlates the data, and provides it through a component interface with a particular format and protocol. Accordingly, the position information receptor of the receiving means 31 receives a position signal or signals from an external position transponder system, performs physical interface layer processing, correlates the data, and provides it through a component interface with a particular format and protocol. The cited example with the GPS controller 30 assumes NMEA-0183 message formats. However, alternative GPS message formats, such as Trimble's proprietary TSIP format, would also apply. Also, alternative positioning systems from GPS, such as IMU, are also supported by the architecture.

The GPS controller 30 further comprises a data packet modem such as a half-duplex data modem (full-duplex not being needed for two-way radio) which when transmitting position information from the position information receptor of the receiving means 31, takes positioning data and implements a modulation scheme to impose position information onto an output baseband audio signals via the signal converter 32. When receiving position information, the component demodulates and extracts the position data from the input baseband audio signal. Aside from position information, the data packet modem also conveys control and configuration messages. In this mode, this data packet modem also serves to fortify the position information so as to maintain its integrity through over-the-air transmission. In the cited example, an FFSK/MSK data modem supporting a 2400 bps data rate was used based on cost, reliability, and performance trade-offs. A data modem with alternative modulation schemes may be used and alternative data rates may be employed. Data rates much lower than 2400 bps are probably not practical in this application because of a perceived annoyance factor of in-band tones lasting much more than about 300 ms. The cited example supports FEC, CRC, and interleaving options for data integrity.

According to the preferred embodiment, the GPS controller 30 further comprises a baseband signal processor which serves to mix the microphone input baseband signal with the data modem signal and passes it to the radio for transmission. For receive operation, the baseband signal processor takes the receiving audio baseband signal from the radio and delivers it to the local speaker and to the data modem for processing. The baseband signal processor can also perform voice filtering with options such as de- and pre-emphasis, and voice gain control although these are not germane to position information processing.

The GPS-microphone may further comprise a portable case 101 to receive the radio frequency transmitter 20, the GPS controller 30, and a power source 102 providing electrical power supply to the speaker-microphone set 10, the radio frequency transmitter 20, and the GPS controller 30. Accordingly, the power source 102 of the GPS-microphone comprises a rechargeable battery disposed in the portable case 101 wherein the rechargeable battery is electrically connected to speaker-microphone set 10 to supply electricity.

Figure 5:
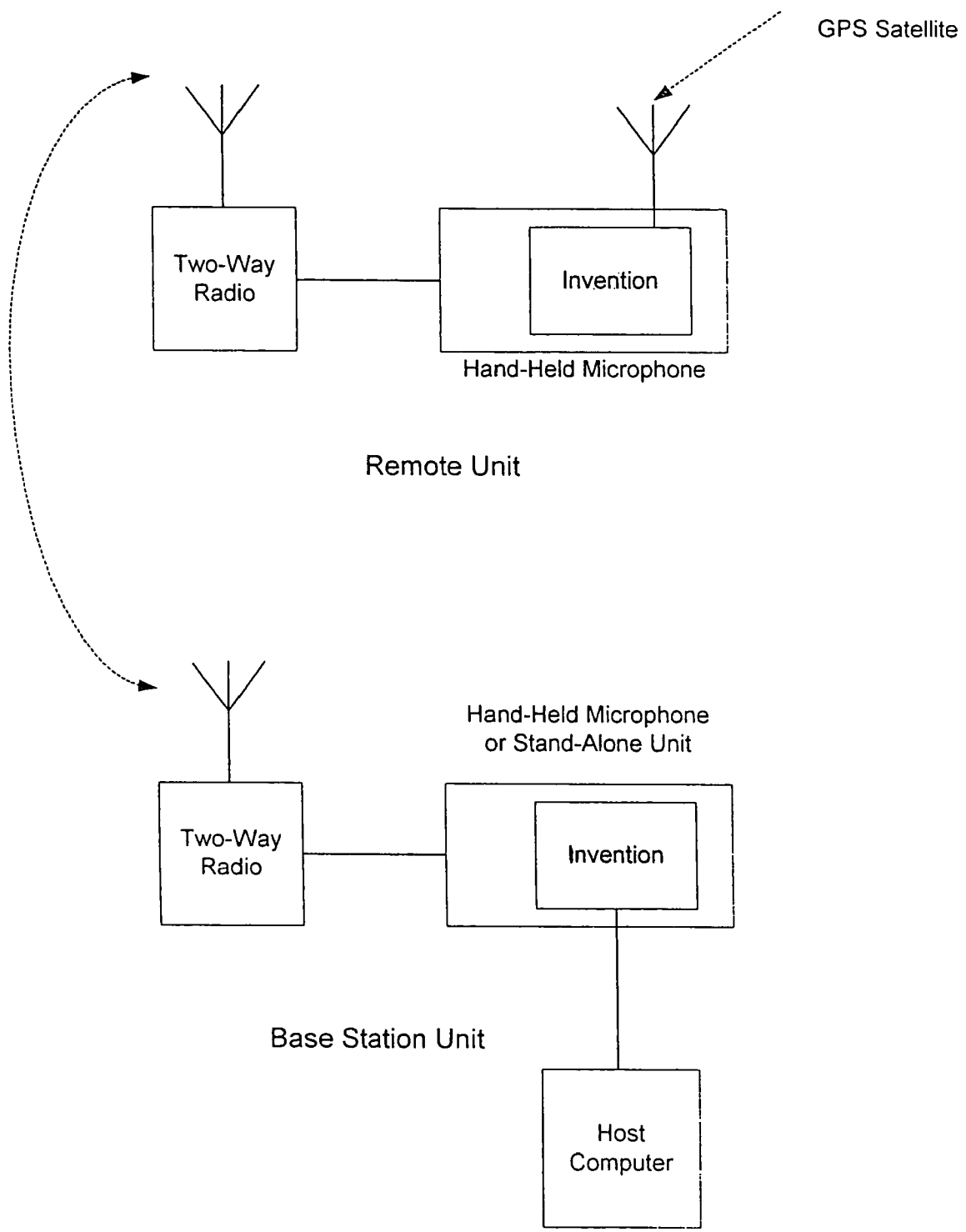
FIG. 5 is a block diagram showing the GPS-microphone of the present invention employed in a typical two-way radio system.

FIG. 5 illustrates the GPS-microphone of the present invention employed in a typical two-way radio system. On the Remote Unit side of the GPS-microphone, GPS satellite information is received via a GPS antenna of the receiving means 31 that is part of the GPS-microphone residing within the hand-held microphone unit of the speaker-microphone set 10. This information is conveyed to the remote unit two-way radio which transmits it via the radio's RF antenna of the radio frequency transmitter 20 thereof. On the base station side of the communication system, the RF antenna on the two-way radio receives the communique and the radio puts out a baseband signal on the speaker out signal which goes out to another hand-held microphone unit of the other GPS-microphone. However, note that the GPS-microphone need not be housed in the microphone chassis of the base station unit, and may be more suitable housed in a stand-alone package since that co-location is no longer critical in a base station set-up. Also note that for the base station, the GPS antenna and receiver unit is not used and may be eliminated, and note that a host computer interface exists. The host computer in the communication system collects the GPS position data output by the controller of the GPS-microphone and can display and back-end process this data as so desired. The host computer is also used to send control messages to the GPS-microphone on the base station side. The controller interprets the message, commands the packet modem and the baseband processor to mix and send the message which is put out as a baseband signal on the mic-audio line to the base station two-way radio. The base station radio transmits to the remote unit via RF. The remote unit two-way radio passes a baseband signal on the speaker out line to the hand-held microphone unit of the GPS-microphone. The GPS-microphone extracts the message with the baseband processor and packet modem and passes it to the controller. The controller then interprets the message and acts accordingly.

Figure 6:
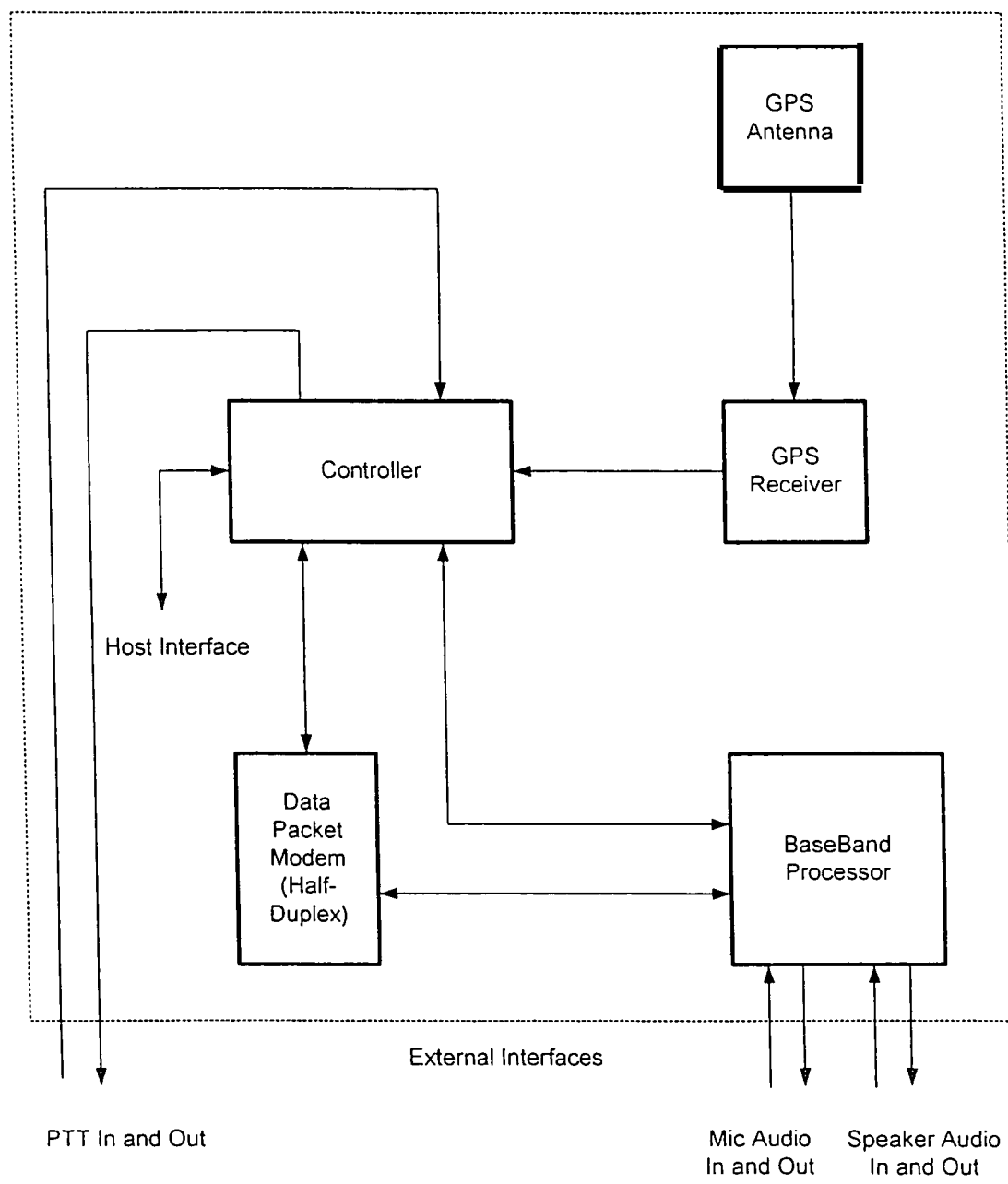
FIG. 6 is a block diagram showing the components of the GPS-microphone and their interaction according to the above preferred embodiment of the present invention.
Figure 7:
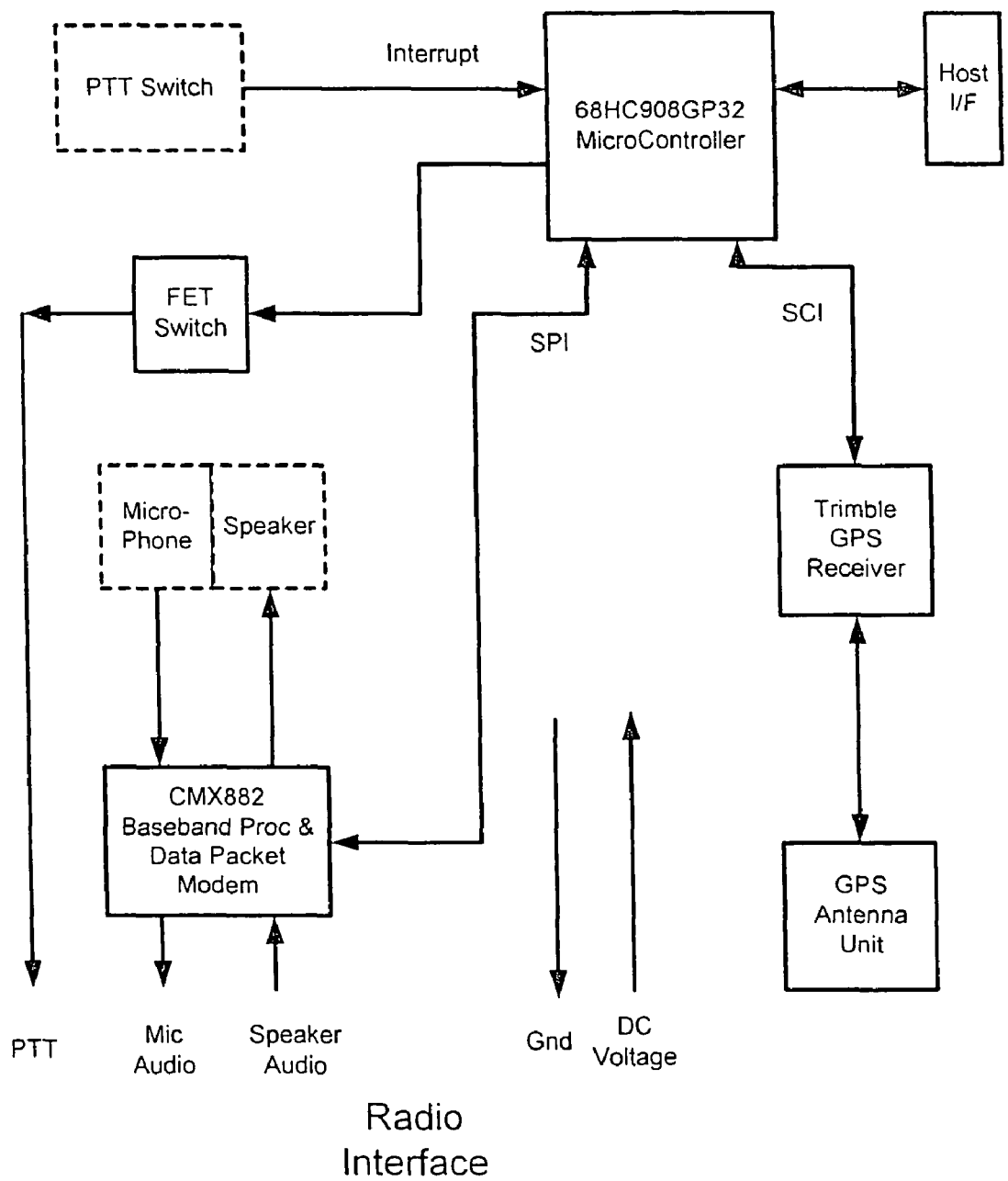
FIG. 7 illustrates the relationship of the components of the GPS-microphone according to the above preferred embodiment of the present invention.

FIG. 6 shows the internal components of the GPS-microphone of the present invention and how they interface with one another. The figure also shows the external interface. Note that the interface signals are in all grouped as In/Out pairs. This is because the existing radio to hand-held microphone interface signals is severed to accommodate the GPS-microphone of the present invention as shown in FIG. 4.

As shown in FIG. 2, the present invention further provides a process of transmitting the positioning data from the GPS-microphone to the communication system, which comprises the following steps.

(1) Communicatively network the radio frequency transmitter 20 to the communication system through radio frequency signals.

(2) Convert the positioning data, by the GPS controller 30, into the RF positioning signals in form of audio signals.

(3) Transmit the RF positioning signals to the communication system by the radio frequency transmitter 20.

In step (1), the communication system should provide a coverage area wherein when the radio frequency transmitter 20 is located within the coverage area, the GPS-microphone is capable of communicatively networking with the communication system. Once the communication connection is established, the radio transmitter 20 is capable of not only sending out the audio signals from the speaker-microphone set 10 but also transmitting the RF positioning signals from the GPS controller 30. In addition the communication system should send a GPS acquisition configuration command to the GPS-microphone through the radio frequency signals.

In step (2), the GPS controller 30 is activated when the PTT circuitry 13 of the speaker-microphone set 10 is triggered wherein the audio signals from the speaker-microphone set 10 can be combined with the RF positioning signals from the GPS controller 30 to form an information signal so as to transmit to the communication system through the radio frequency transmitter 20. In other words, once the user triggers the PTT circuitry 13 to communicate with the communication system, the GPS controller 30 is automatically activated to receive the positioning data and to convert the positioning data into the RF positioning signals so as to send out the information signal having the RF positioning signals and the audio signals via the radio frequency transmitter 20. In addition, the communication system is preferably recorded the information signal from the GPS-microphone as a positioning location history for safety purpose.

Accordingly, the GPS controller 30 would further generate an identification signal, which is in form of the audio signal, with respect to the speaker-microphone set 10 wherein when the RF positioning signals are transmitted from the radio frequency transmitter 20, the identification signals are combined with the RF positioning signals to transmit to the communication system. The main purpose of the identification signal is to identify the respective GPS-microphone when more than one GPS-microphones are used at the same time. In other words, the radio frequency transmitter 20 is arranged to transmit the information signal which includes the audio signal, the RF positioning signals and the identification signal to the communication system.

Alternatively, the GPS controller 30 is preset to be activated for receiving the positioning data for a predetermined period of time in step (2). For example, the user is able to preset the GPS controller 30 to receive the positioning data for every ten minutes in such a manner that once the GPS controller 30 encodes the RF positioning signals, the radio frequency transmitter 20 is ready to transmit the RF positioning signals to the communication system even though there is no audio signal received from the speaker-microphone set 10.

In addition, the GPS controller 30 is activated when a request is sent from the communication system. Accordingly, the request is a RF signal sent from the communication system and is received by the radio frequency transmitter 20 wherein the request is arranged to automatically activate the GPS controller 30 to receive the positioning data so as to transmit the RF positioning signals to the communication system as a feedback. It is important that when the user is unable to activate the GPS controller 30, the communication system is capable of remotely controlling the activation of the GPS controller 30 to track the positioning location of the user. Furthermore, the GPS controller 30 can be manually activated by the user by simply switching on the GPS controller 30, such as pressing an activation button of the GPS controller 30.

The communication system, according to the preferred embodiment, comprises a control center 40 which comprises means 41 for receiving the information signal from the GPS-microphone, means 42 for decoding the information signal from the receiving means 41, and a processor center 50 converting the RF positioning signals back to the positioning data. The receiving means 41 is a signal receiver to communicatively network with the GPS-microphone through the radio frequency signals.

The decoding means 42 is a signal decoder adapted for decoding the information signal received by the receiving means 41. Accordingly, when the information signal, which combines the audio signals and the RF positioning signals with the identification signal, is received by the receiving means 41, the decoding means 42 is arranged to decode the audio signals to readable audio data while the RF positioning signals and the identification signal are then transmitted to the processor center 50.

Accordingly, the processor center 50 is arranged to convert the RF positioning signals into a readable positioning data in such a manner that the communication system is adapted to identify the respective GPS-microphone through the identification signal and locate the position of the GPS-microphone according to the readable positioning data. It is worth to mention that when GPS controller 30 of the GPS-microphone is preset to be activated for a period of time, only the RF positioning signals and the identification signal are transmitted to the signal processor 50 while no audio signal is decoded into the readable audio data.

Figure 1:
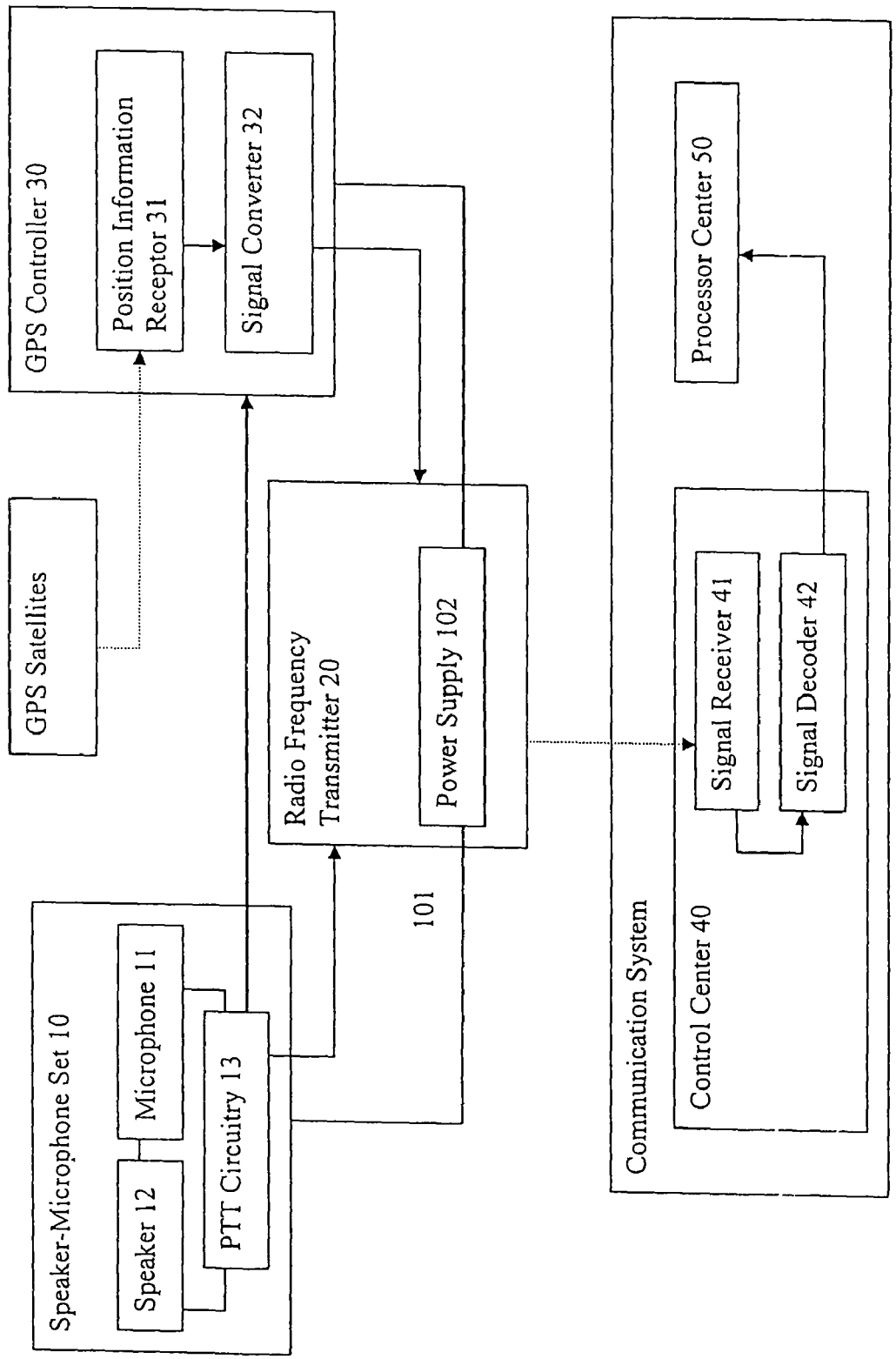
FIG. 1 is a block diagram of a GPS-microphone for a communication system according to a preferred embodiment of the present invention.

FIG. 1 illustrates an example use of the GPS-microphone. While patrolling, the police officer should carry the GPS-microphone wherein the communication system is installed into the vehicle. Once the communication network is established between the radio frequency transmitter 20 and the communication system, the GPS-microphone is capable of transmitting the RF positioning signals to the communication system through the radio frequency transmitter 20. Therefore, another police officer in the vehicle is able to keep track the location of the police officer who is carrying the GPS-microphone.

FIG. 3 illustrates another example of the GPS-microphone, wherein the control center 40 is installed into the vehicle while the processor center 50 is located at the police station in such a manner that the police office carrying the GPS-microphone is able to communicate with the police office in the vehicle as a conventional two-way radio system while the positioning data is transmitted from the GPS-microphone to the processor center 50 through the control center 40. In other words, the control center 40 functions as a communication center to the GPS-microphone wherein the control center is capable of communicatively networking with the processor center 50 to transmit the positioning data for a long coverage distance.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A communication apparatus for transmitting a positioning data to a communication system, comprising:

a communication unit comprising a triggering circuitry arranged to be triggered to activate said communication unit in a transmit mode for transmitting and converting a voice message into one or more communication audio signals;

a positioning controller operatively linked to said triggering circuitry and arranged in such a manner that when said triggering circuitry is triggered to activate said positioning controller, said positioning controller is adapted for converting said positioning data into one or more communication positioning signals; and a transmitter for communicatively networking with said communication system, wherein when said trigger circuitry is triggered to activate both said communication unit and said position controller at the same time, said transmitter is adapted for transmitting both said communication audio signals and said communication positioning signals to said communication system;

thereby, every time when a user of said communication apparatus communicates with said communication system, the user is able to trigger said triggering circuit to transmit not only said communication audio signals from said communication unit to said communication system via said transmitter, but also said communication positioning signals from said positioning controller to said communication system via said transmitter at the same time, wherein said triggering circuit is a PTT (Push-To-Talk) circuitry, wherein said transmitter is a radio frequency transmitter and is arranged to transmit said communication audio signals and said communication positioning signals in RF form.

2. A communication apparatus for transmitting a positioning data to a communication system, comprising:

a communication unit comprising a triggering circuitry arranged to be triggered to activate said communication unit in a transmit mode for transmitting and converting a voice message into one or more communication audio signals;

a positioning controller operatively linked to said triggering circuitry and arranged in such a manner that when said triggering circuitry is triggered to activate said positioning controller, said positioning controller is adapted for converting said positioning data into one or more communication positioning signals; and a transmitter for communicatively networking with said communication system, wherein when said trigger circuitry is triggered to activate both said communication unit and said position controller at the same time, said transmitter is adapted for transmitting both said communication audio signals and said communication positioning signals to said communication system;

thereby, every time when a user of said communication apparatus communicates with said communication system, the user is able to trigger said triggering circuit to transmit not only said communication audio signals from said communication unit to said communication system via said transmitter, but also said communication positioning signals from said positioning controller to said communication system via said transmitter at the same time, wherein said communication audio signals and said communication positioning signals are combined to form an information signal in order to transmit to said communication system.

3. The communication apparatus, as recited in claim 1, wherein said communication audio signals and said communication positioning signals are combined to form an information signal in order to transmit to said communication system.

4. A communication apparatus for transmitting a positioning data to a communication system, comprising:

a communication unit comprising a triggering circuitry arranged to be triggered to activate said communication unit in a transmit mode for transmitting and converting a voice message into one or more communication audio signals;

a positioning controller operatively linked to said triggering circuitry and arranged in such a manner that when said triggering circuitry is triggered to activate said positioning controller, said positioning controller is adapted for converting said positioning data into one or more communication positioning signals; and a transmitter for communicatively networking with said communication system, wherein when said trigger circuitry is triggered to activate both said communication unit and said position controller at the same time, said transmitter is adapted for transmitting both said communication audio signals and said communication positioning signals to said communication system;

thereby, every time when a user of said communication apparatus communicates with said communication system, the user is able to trigger said triggering circuit to transmit not only said communication audio signals from said communication unit to said communication system via said transmitter, but also said communication positioning signals from said positioning controller to said communication system via said transmitter at the same time, wherein said positioning controller is preset to be self-activated for a period of predetermined time to transmit said communication positioning signals to said communication system via said transmitter without said communication audio signals.

5. The communication apparatus, as recited in claim 1, wherein said positioning controller is preset to be self-activated for a period of predetermined time to transmit said communication positioning signals to said communication system via said transmitter without said communication audio signals.

6. The communication apparatus, as recited in claim 2, wherein said positioning controller is preset to be self-activated for a period of predetermined time to transmit said communication positioning signals to said communication system via said transmitter without said communication audio signals.

7. The communication apparatus, as recited in claim 3, wherein said positioning controller is preset to be self-activated for a period of predetermined time to transmit said communication positioning signals to said communication system via said transmitter without said communication audio signals.

8. A communication apparatus for transmitting a positioning data to a communication system, comprising:
- a communication unit comprising a triggering circuitry arranged to be triggered to activate said communication unit in a transmit mode for transmitting and converting a voice message into one or more communication audio signals;
- a positioning controller operatively linked to said triggering circuitry and arranged in such a manner that when said triggering circuitry is triggered to activate said positioning controller, said positioning controller is adapted for converting said positioning data into one or more communication positioning signals; and
- a transmitter for communicatively networking with said communication system, wherein when said trigger circuitry is triggered to activate both said communication unit and said position controller at the same time, said transmitter is adapted for transmitting both said communication audio signals and said communication positioning signals to said communication system;
- thereby, every time when a user of said communication apparatus communicates with said communication system, the user is able to trigger said triggering circuit to transmit not only said communication audio signals from said communication unit to said communication system via said transmitter, but also said communication positioning signals from said positioning controller to said communication system via said transmitter at the same time,
- wherein said communication system comprises a control center which comprises a communication signal receiver communicatively networking with said communication apparatus for receiving said communication audio signals and said communication positioning signals from said communication apparatus, means for converting said communication positioning signals from said receiving means, and a processor center converting said communication positioning signals back to said positioning data.

9. The communication apparatus, as recited in claim 1, wherein said communication system comprises a control center which comprises a communication signal receiver communicatively networking with said communication apparatus for receiving said communication audio signals and said communication positioning signals from said communication apparatus, means for converting said communication positioning signals from said receiving means, and a processor center converting said communication positioning signals back to said positioning data.

10. The communication apparatus, as recited in claim 3, wherein said communication system comprises a control center which comprises a communication signal receiver communicatively networking with said communication apparatus for receiving said communication audio signals and said communication positioning signals from said communication apparatus, means for converting said communication positioning signals from said receiving means, and a processor center converting said communication positioning signals back to said positioning data.

11. The communication apparatus, as recited in claim 7, wherein said communication system comprises a control center which comprises a communication signal receiver communicatively networking with said communication apparatus for receiving said communication audio signals and said communication positioning signals from said communication apparatus, means for converting said communication positioning signals from said receiving means, and a processor center converting said communication positioning signals back to said positioning data.

* * * * *